United States Patent [19]

Marquet et al.

[11] Patent Number: 4,946,277
[45] Date of Patent: Aug. 7, 1990

[54] OPTO-ELECTRONIC DEVICE FOR DETECTING AND LOCATING A RADIANT SOURCE

[75] Inventors: Patrice Marquet, Paris; Jean-Marc Lemaire, Rueil Malmaison; Philippe Dunouvion, Paris, all of France

[73] Assignee: Thomson CSF, Paris, France

[21] Appl. No.: 249,894

[22] Filed: Sep. 27, 1988

[30] Foreign Application Priority Data

Oct. 2, 1987 [FR] France ............................ 87 13666

[51] Int. Cl.$^5$ ............................ G01C 1/00; G01J 1/20
[52] U.S. Cl. .................................. 356/141; 356/152; 250/203.1; 250/237 R
[58] Field of Search .............................. 356/141, 152; 250/237 R, 203 R

[56] References Cited

U.S. PATENT DOCUMENTS

| 3,287,562 | 11/1966 | Connors, Jr. et al. | 250/237 R |
| 3,486,030 | 12/1969 | Eckermann. | |
| 3,496,367 | 2/1970 | Eckermann | 250/237 R |
| 3,723,013 | 3/1973 | Stirland et al. | 356/152 |
| 3,764,198 | 10/1973 | Hunzinger. | |
| 3,954,340 | 5/1976 | Blomqvist. | |
| 4,006,356 | 2/1977 | Johnson et al. | 250/203 R |
| 4,081,669 | 3/1978 | Klingman | 356/152 X |
| 4,843,227 | 6/1989 | Matsui et al. | 250/201 |

FOREIGN PATENT DOCUMENTS 0004227 9/1979 European Pat. Off. .
88402433 12/1988 European Pat. Off. .
2583197 12/1986 France .
1027457 4/1966 United Kingdom .
1459386 12/1976 United Kingdom .

OTHER PUBLICATIONS

Mechanical Engineering, vol. 96, No. 11, Nov. 1974, p. 43, New York, N.Y., U.S.A.; "Sun Gate Sensor System", *FIG. 1*.
Laser Focus, vol. 17, No. 4, Apr. 1981, pp. 72–80, Newton, Mass., U.S.A.; P. T. Ballard: "Detecting Laser Illumination for Military Countermeasures", *En entier*.

Primary Examiner—Thomas H. Tarcza
Assistant Examiner—Linda J. Wallace
Attorney, Agent, or Firm—Cushman, Darby & Cushman

[57] ABSTRACT

The device permits a wide field of detection with high sensitivity and high locating precision. To this end, the device has a four-quadrant detector associated with a diaphragm formed by the central transparent zone of an opaque mask. The diaphragm preferably has a circular shape and no focusing lens. These elements are in parallel planes so that the line joining the centers of the diaphragm and the detector is perpendicular to these planes. The set is placed in a housing and is shielded by a transparent window. With a deviation measurement circuit that processes the detected signals, the assembly enables the computation of the angular offset of a pinpoint radiant source. With two elementary sensors of this type, it is possible to compute the spatial location of the source, for example a laser.

18 Claims, 1 Drawing Sheet

OPTO-ELECTRONIC DEVICE FOR DETECTING AND LOCATING A RADIANT SOURCE

BACKGROUND OF THE INVENTION

1. Field of the Invention

The present invention relates to an opto-electronic device for detecting and locating a radiant source.

The locating is made with respect to two reference axes, such as the elevation and azimuthal axes, thus giving the direction of the source with respect to the device. With two devices, it is possible to produce two secant directional locations and thus measure the spatial location of the source.

The term "radiant source" refers either to a distant source or a source which is nearer but is small so that it can be likened to a pinpoint source or to a source at infinity.

2. Description of the Prior Art

There is a known method of making a so-called two-axis deviation measurement of a pinpoint light source or a source than can be likened to a source at infinity by using a four-quadrant detector. The detector is located downline of an optical lens which concentrates the incident radiation received from the source in the form of a parallel beam so as to form, therefrom, a light spot of a defined mean dimension in the photodetection plane. The four respective signals detected are processed by summation and weighting to measure the angular offset in elevation and azimuth with respect to the optical axis of the device. The French patent No. 2.420.144 or the U.S. Pat. No. 4.286.760) describes a device for detecting and locating radiant sources of this type.

With the constantly growing use of lasers in weapon systems (for telemeters, illuminators, etc), it is becoming necessary to warn the crew of a vehicle or aircraft if this vehicle or aircraft becomes illuminated. Corresponding instruments, called laser warning detectors, are aimed solely at detecting the presence of a threat within a wide field around the carrier, for example 360° in azimuth and 90° in elevation.

The above-mentioned locating devices are not usually designed to function in fields of this range. Their adaptation to these fields entails a loss of sensitivity which is incompatible with the detection of the useful signal.

An object of the invention is to overcome the above-mentioned drawbacks by combining the four-quadrant detector with a single upline circular aperture forming a diaphragm.

The fact of having no focusing lens enables a device of this type to have, simultaneously, a wide field which which may be greater than ±45°, and a large pupil linked solely to the dimension of the detector. The device can further be used in any spectral band and also to receive continuous or pulsed transmissions. It has resolution of a few degrees and its sensitivity, related to the detection surface, is high.

SUMMARY OF THE INVENTION

According to the invention, there is provided an opto-electronic device for detecting and locating radiant sources comprising a plane, four-quadrant detector; an optical receiver preceding said detector and consisting of a plane diaphragm parallel to the detector, formed by a transparent central zone of an opaque mask, so as to enable said detection and locating of sources in a wide field of observation which may be greater than ±45° in elevation and/or in azimuth; and circuits for the processing and deviation measurement of the four signals detected by the quadrants to locate the direction of the source with respect to the reference optical direction of the device, formed by the axis of said field passing through the center of the detector and the center of the diaphragm.

BRIEF DESCRIPTION OF THE DRAWING

The features and advantages of the invention will appear from the following description, given by way of example and made with reference to the appended figures, of which.

DESCRIPTION OF A PREFERRED EMBODIMENT

Figure 1:
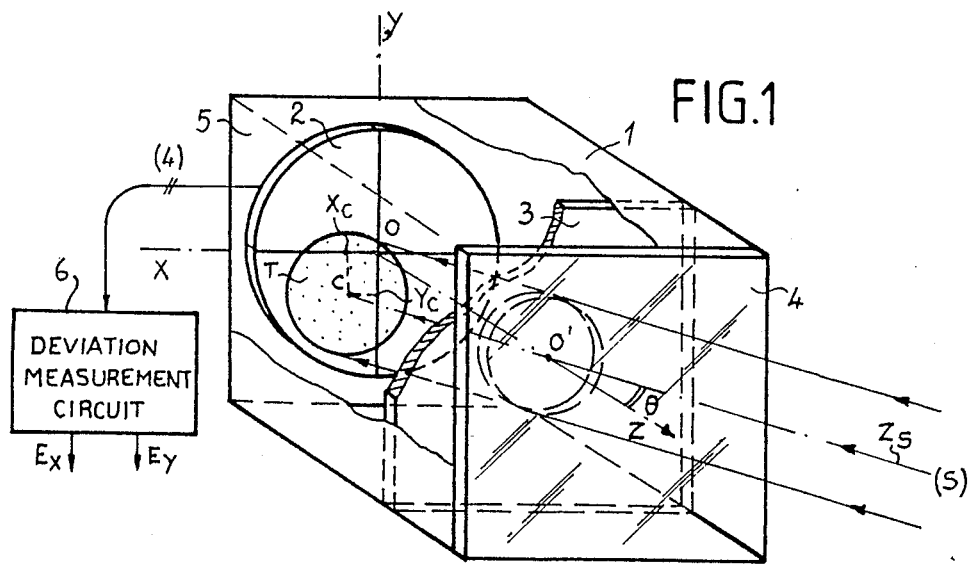
FIG. 1 is a drawing of a detecting and locating device according to the invention.

Referring to FIG. 1, the device has a housing 1 to insulate the four-quadrant detector 2 from ambient radiation. This plane detector 2 is mounted on a plane face 5 at the back of the housing. Parallel to the detector 2, a diaphragm 3 is contained in a plane parallel to the detecting device. The diaphragm is shown partially cut out to clarify the drawing. It has a transparent part or an aperture, for example a circular aperture, with a diameter $\phi d$ (FIG. 3) through which the light rays pass. The remaining part of the diaphragm 3 has zero transparence and forms an opaque mask.

Preferably, the diaphragm is preceded by a transparent window 4 which constitutes the front face of the housing 1 so as to insulate the device from the environment and, especially, to prevent dust from entering.

The window 4 may be provided with a deposited coat 7 (FIG. 3) forming an optical filter and located on the internal side of the housing 1, or it may consist of an absorbent glass limiting the spectral band.

According to an alternative embodiment, the transparent part 4 forming a window may be placed at the aperture of the diaphragm 3, thus simplifying the installation but laying down a fixed value for the diameter $\phi d$ of the diaphragm.

The device is completed by electronic circuits 6 for processing and deviation measurement which compute the deviations EX and EY from the point C, corresponding to the center of the circle of the luminous spot T formed by the incident rays passing through the circular aperture of the diaphragm. The radiation comes from the source S and may be considered to be received in the form of a beam of parallel rays. The axis Z passing through the center O of the detector and the center O' of the aperture is the optic axis Z of the device. The direction ZS is the one presented by the source S and the angle $\theta$ is the angular offset of this source with respect to the device. The deviation coordinates XC and YC correspond to the deviations, in elevation and azimuth, of the source detected along the two cartesian axes X and Y.

Figure 2:
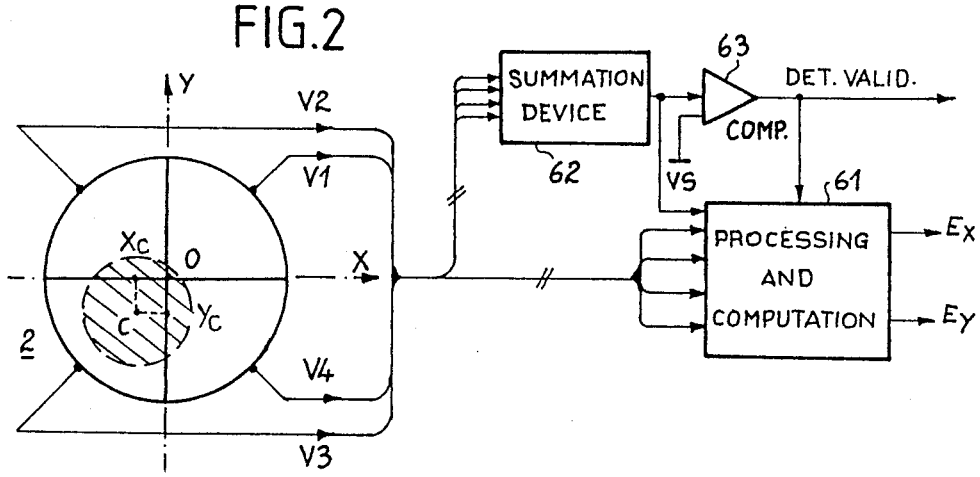
FIG. 2 is a block diagram relating to the detector and the electronic circuit.

FIG. 2 shows the electronic circuits. The four detection outputs V1 to V4 are applied to the deviation measurement circuits 61. Furthermore, a second channel may be provided having, at its input, a summation device 62 followed by a threshold comparator circuit 63 to validate the detection of a radiant source of defined intensity. The validation is transmitted, in particular, to the deviation measurement circuits 61.

The deviations EX and EY are deduced by computation from the standard formulae:

$$EX = \frac{(V1 + V4) - (V2 + V3)}{V1 + V2 + V3 + V4}$$

$$EY = \frac{(V1 + V2) - (V3 + V4)}{V1 + V2 + V3 + V4}$$

The shape of the deviation measurement curve (FIG. 4) can be adapted by working on the distance D between the diaphragm 3 and the detector 2 (FIG. 3) as well as on the shape and dimension of the aperture of the diaphragm.

The shape of the aperture may differ from the circular one shown. For example, a square aperture gives a deviation measurement which is proportionate to $tg\theta$ ($\theta$ being the offset angle) hence a difference which is not linear with this parameter. On the contrary a round aperture makes it possible to linearize the response curve as a function of the offset.

Figure 3:
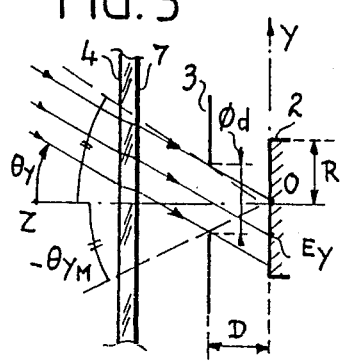
FIG. 3 is a cross-sectional drawing of the device.
Figure 4:
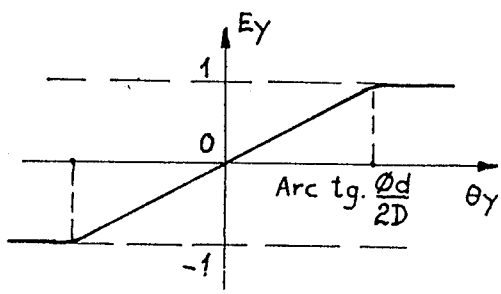
FIG. 4 shows the response curve of the device.

FIG. 4 shows this response curve for the offset along the axis Y in relation to FIG. 3 which corresponds to a section along the axes Y and Z.

The distance D may be chosen as being reduced, thus considerably increasing the detection field without changing the sensitivity of the device.

The system is optimized for the circular aperture envisaged, and the diameter Od is chosen as being equal to the radius R of the detector 2. In this case, the deviation measuring unit is saturated when $XC = \phi d/2$, namely $tg\theta_X = \phi d/2D$. The same applies to EX and $\theta_Y$ (FIG. 4).

In a more complicated embodiment, the parameters D and $\phi d$ may be taken to be adjustable by using a diaphragm which is variable and can be shifted according to known methods.

The electronic processing and computation circuits 6 may be made as small-sized, solid-state circuits and may be incorporated in the housing behind the face 5. For the computation, an available ancillary computer may also be used. The selection of the useful radiation, namely the radiation coming from the source S to be localized, is obtained in a known way with a detector sensitive in the radiation spectra corresponding to the sources to be detected. The spectral range of operation may, in the case of the detection of laser illuminators, be located in the near or far infra-red. The complementary use of optical filtering, advantageously achieved by deposition on the internal wall of the window 4 is not excluded.

For use in laser warning detection, transmitting at 1.06 μm, there are standard 16 mm diameter detectors. By placing a circular diaphragm 3, with an aperture of 8 mm, at a distance of 4 mm in front of the detector, a linear deviation measurement signal is obtained depending on the offset in a ±45° field. In this example, the area of the pupils is 0.5 cm².

What is claimed is:

1. An opto-electronic device for detecting and locating radiant sources comprising:
   —a plane, four-quadrant detector for producing four signals, one for each quadrant,
   —an optical receiver preceding said detector and including a plane diaphragm parallel to the detector, formed by a transparent central zone of an opaque mask, so as to enable said detecting and locating of sources in a wide field of observation greater than ±45° in elevation and in azimuth, and
   —circuits for processing and deviation measurement of the four signals detected by the quadrant detector to locate a direction of the source with respect to a reference optical direction of the device, formed by an axis of said field passing through a center of the detector and a center of the diaphragm wherein the central zone of said diaphragm is circular, and wherein the four-quadrant detector has a circular shape, and a diameter of the diaphragm is being equal to a radius of the four-quadrant detector.

2. A device according to claim 1 wherein the diaphragm is preceded by a transparent shielding window forming the front face of a housing within which are arranged the diaphragm and the detector.

3. A device according to claim 2 comprising an optic filter.

4. A device according to claim 3 wherein the optic filter is made by deposition on the face of the window inside the housing.

5. A device according to claim 1 comprising an optic filter.

6. An opto-electronic device for detecting and locating radiant sources comprising;
   —a plane, four-quadrant detector for producing four signals, one for each quadrant,
   —an optical receiver preceding said detector and including a plane diaphragm parallel to the detector, formed by a transparent central zone of an opaque mask, so as to enable said detecting and locating of sources in a wide field of observation greater than ±45° in elevation and in azimuth, and
   —circuits for processing and deviation measurement of the four signals detected by the quadrant detector to locate a direction of the source with respect to a reference optical direction of the device, formed by an axis of said field passing through a center of the detector and a center of the diaphragm, wherein the central zone of said diaphragm is circular, and wherein the diaphragm can be adjusted to modify a diameter of the central zone and can also be shifted to modify its distance from the plane detector so as to modify its distance from the plane detector so as to modify the angular aperture of the field of observation.

7. A device according to claim 6 wherein the diaphragm is preceded by a transparent shielding window forming the front face of a housing within which are arranged the diaphragm and the detector.

8. A device according to claim 6 comprising an optic filter which is formed by deposition on the front face of the window inside the housing.

9. An opto-electronic device for detecting and locating radiant sources in a wide field of observation comprising:
   —an optical receiver receiving unfocussed radiant energy from said radiant sources, comprising a plane diaphragm having a specified aperture with a center O', said plane diaphragm formed by a transparent central zone of an opaque mask;
   —a plane detector located to receive unfocussed radiant energy from said optical receiver, having four quadrants which are bounded by two orthogonal axis OX, OY, where O is a center of said plane detector, for respectively detecting four signals, one indicative of radiant energy on each said quadrant, when a radiant source is in the field of observation, said diaphragm and said detector being parallel, and orthogonal to an axis OO' between said center O and said center O' which axis is a reference optical direction for the device, and —means for processing and deviation measurement, receiving the for signals, and determining a direction of said source in relation to said reference optical direction for a deviation measurement curve determined according to a distance D between a plane in which said diaphragm is located and a plane in which said detector is located and to a shape and dimension of the aperture of said diaphragm.

10. A device according to claim 9 further comprising a housing having a transparent shielding window forming a front face of a housing, within which the diaphragm and the detector are placed.

11. A device according to claim 10 further comprising an optical filter made by deposition on the face of the window inside the housing.

12. A device according to claim 11 wherein the diaphragm can be adjusted to modify a diameter of the aperture and can also be shifted to modify its distance from the plane detector so as to modify an angular aperture of the field of observation.

13. A device according to claim 9, wherein the aperture of said diaphragm and said detector have circular shapes.

14. A device according to claim 13, wherein a diameter of the aperture of said diaphragm is equal to a radius of the detector.

15. A device as in claim 13 wherein said processing means calculates EX and EY from a center O according to the equations:

$$EX = \frac{(V1 + V4) - (V2 + V3)}{V1 + V2 + V3 + V4}$$

$$EY = \frac{(V1 + V2) - (V3 + V4)}{V1 + V2 + V3 + V4}$$

where V1–V4 are signals from a first quadrant through a fourth quadrant respectively.

16. An opto-electronic device for detecting and locating radiant sources in a wide field of observation comprising:

a light receiver assembly which has no focusing device consisting essentially of:
(a) an optical receiver comprising a plane diaphragm having a specified aperture with a center O', said plane diaphragm formed by a transparent central cone of an opaque mask; and
(b) a plane detector having four quadrants which are bounded by two orthogonal axis oX, OY where O is a center of said plane detector, for respectively detecting four signals, one indicative of radiant energy on each said quadrant, when a radiant source is in the field of observation, said diaphragm and said detector being parallel, and orthogonal to an axis OO' between which is a reference optical direction for the device, and —means for processing and deviation measurement, receiving the four signals, and determining a direction of said source in relation to said reference optical direction from a deviation measurement curve determined according to a distance D between a plane of said diaphragm and a plane of said detector and to a shape and dimension of the aperture of said diaphragm.

17. A device according to claim 16 further comprising a housing having a transparent shielding window forming a front face of a housing within which said light receiver assembly is placed.

18. A device according to claim 17 further comprising an optical filter made by deposition on the face of the window inside the housing.

* * * * *